Feb. 21, 1956   F. G. GOEDDERZ   2,736,014
SIGNAL FOR LIGHTS OF AUTOMOBILE
Filed Aug. 1, 1952
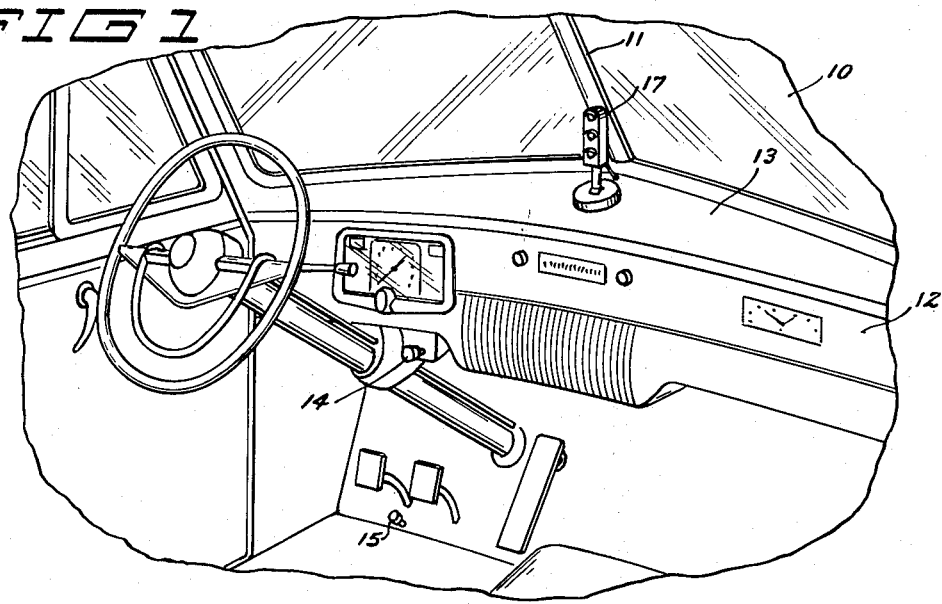
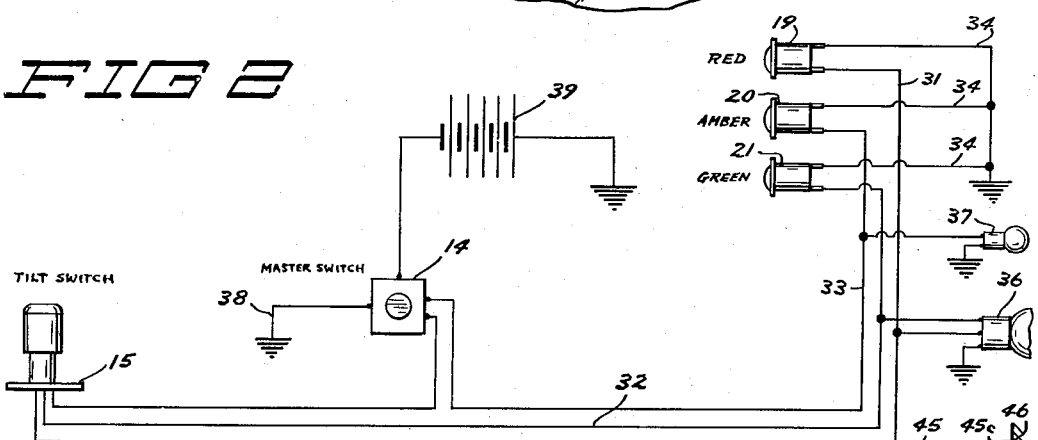
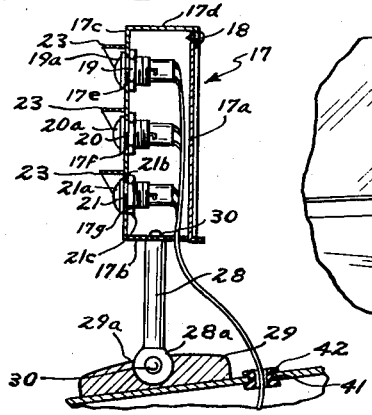
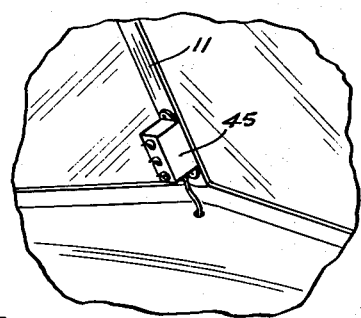
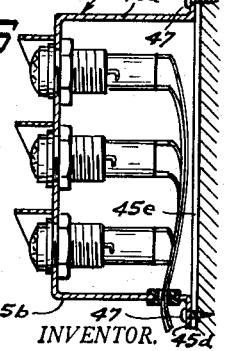
INVENTOR.
FRANK G. GOEDDERZ
BY Chas. C. Reif
ATTORNEYS

United States Patent Office 2,736,014
Patented Feb. 21, 1956

2,736,014

SIGNAL FOR LIGHTS OF AUTOMOBILE

Frank G. Goedderz, Minneapolis, Minn.

Application August 1, 1952, Serial No. 302,206

1 Claim. (Cl. 340—252)

This invention relates to a lighting signal to be used in connection with the lighting system of an automobile to indicate whether the lights of the automobile are illuminated and more particularly which of the lights are illuminated. It is particularly desirable to have such a signal positioned where it can be seen readily by the operator of the vehicle without it being necessary for the operator to take his eyes away from the field of vision of the road ahead.

It is an object of this invention to provide a lighting signal to be used in connection with the lighting system of an automobile to indicate whether or not the lights of the automobile are illuminated and which of said lights are illuminated and to be placed in a position where it can be seen readily by the operator of the automobile without it being necessary for him to take his eyes away from the road ahead.

It is another object of this invention to provide a lighting signal to be used in connection with the headlamps and parking lamps of an automobile to indicate whether said lamps are illuminated and which of said lamps are illuminated and to be positioned where it can be seen readily by the driver of the automobile without it being necessary for him to lower his eyes or turn them sideways away from his line of vision of the road ahead.

It is a more specific object of this invention to provide a lighting signal to be used in connection with the lighting system of an automobile having headlamps with high and low beam filaments and parking lamps, said signal being positioned where it can be seen by the operator of the automobile without it being necessary for him to take his eyes away from the road ahead, said signal carrying different colored lights respectively connected in circuit with said filaments and parking lamps to indicate whether either of said filaments or said parking lamps are illuminated.

These and other objects and advantages of the invention will be fully set forth in the following description made in connection with the accompanying drawings in which like reference characters refer to similar parts throughout the several views and in which:

Fig. 1 is a perspective view of the front portion of an automobile showing applicant's device in operative position;

Fig. 2 is a wiring diagram showing applicant's device connected in circuit with the lights of an automobile;

Fig. 3 is a side view of the device shown in vertical section;

Fig. 4 is a view of a modification of the device shown in operative position; and Fig. 5 is a side view in vertical section on an enlarged scale of the device shown in Fig. 4.

Referring to the drawings, a perspective view of a portion of the front interior of an automobile is shown in Fig. 1. Said portion of said automobile is shown as having a windshield 10, a center strip 11 in said windshield, an instrument panel 12, and a cowl 13. A master light switch 14 and a foot-operated switch 15 are shown.

Applicant's device is shown in operating position on cowl 13. Said device comprises a housing portion 17 which is here shown as being generally rectangular in form. Said housing 17 may be made of any suitable material and in the embodiment of the invention here illustrated it is shown as being made of sheet metal. Said housing has a removable rear portion 17a, a bottom portion 17b, a front portion 17c and an upper portion 17d. Said rear portion 17a is removably secured to said upper portion as by metal screws 18. Said bottom portion 17b has an aperture 17g therein adjacent its rear side. Said front portion 17c has apertures 17e, 17f and 17g therein disposed in vertical alinement. Disposed and secured in said apertures respectively are lamp fixtures 19, 20 and 21. In the embodiment of the invention as here illustrated, said fixtures are shown to be an ordinary and well known type of lamp fixture used for holding light bulbs in position in an automobile. Said fixtures respectively have lens portions 19a, 20a and 21a which are shown here as being respectively colored red, amber and green. Said fixtures have flange portions as 21b of fixture 21 adapted to be disposed about said apertures. A rear portion of each of said fixtures is threaded and adapted to receive thereon a lock nut, such as lock nut 21c, of fixture 21. The same is tightened up against the inner side of member 17c to hold said fixture in position. Suitable light bulbs are respectively disposed in said fixtures.

Extending outwardly from said housing for a short distance over said lenses are hood members 23 and the same are secured to said housing in any suitable manner, as by welding.

Said housing 17 is secured to an upstanding member 28. Said member is here shown to be cylindrical in form and as having a substantially semi-cylindrical lower end portion 28a. Said portion 28a has a slight recess 28b in each of its sides. Said portion 28a is adapted to be disposed in a similarly shaped recess 29a in a circular and substantially flat base member 29. Said portion 28a is frictionally held in portion 29a by ball bearings 30. Said bearings are disposed in recesses 28b and extend outwardly slightly therefrom to engage the inner wall of recess 29a. Member 17 is secured to member 28 by a screw 30. Thus housing member 17 is frictionally movable backwardly and forwardly of base 29 to any desired position. In the present invention said base 29 is magnetized. Hence member 29 has a magnetic base member movably positioned to any desired place on cowl 13.

Said members 19, 20 and 21 are respectively connected by conductors to the lighting system of the motor vehicle. Member 19 is connected in circuit by conductor 31 to the foot or tilt switch 15 and will show a red light when the high beam filament of the headlamp 36 is illuminated. Member 21 is connected in circuit by conductor 32 to the switch 15 and to the low beam filament of the headlamp 36 whereby the lens in member 21 will show a green light when the low beam of the headlamp is illuminated. Fixture 20 is connected in circuit by a conductor 33 to the master switch 14 and also to the parking lamp 37 whereby the lens in said fixture will show an amber light when the parking lights are illuminated. Conductors 34 are common conductors and the same may be grounded to the body of the motor vehicle at any desirable point. Conductor 38 indicates a ground wire for the master switch and member 39 indicates the battery of the automobile.

Aperture 41 is shown in cowl 12 and disposed therein is a flexible grommet 42. Said conductors running from said fixtures 19, 20 and 21 are disposed through aperture 17g in the bottom of said housing 17 and through aperture 41 in cowl 12 and thence said conductors are suitably connected in circuit to the lights of the automobile as above described.

In operation, when the lighting system of the vehicle is turned on, one of the lamps in housing 17 will always be illuminated. If the master switch 14 is turned or pulled out only to the point where the parking lights 37 are illuminated, then the amber lens in housing 20 will be illuminated. If the master switch 14 is pulled out or turned to illuminate the headlamps 36, then either the red or the green lenses in said fixtures 19 or 21 will be illuminated. The lamp in the fixture 19 is connected to the high beam filaments in the headlamps 36, and the lamp in the fixture 21 is connected to the low beam filaments in said headlamps 36. Fixture 19 has a red lens therein and fixture 21 has a green lens therein. These lenses will be respectively illuminated to indicate whether the high beam filaments or the low beam filaments in the headlamps are illuminated. Applicant's lighting signal is shown as being pivotally mounted on a magnetized base so that said signal may be moved to any desirable position on cowl 13 and housing portion 17 may be pivotally moved backwardly or forwardly so that said signal is brought within the operator's field of vision while operating the motor vehicle and it will not be necessary for the operator to take his eyes away from the road ahead of him in order to see applicant's lighting signal.

A modification of applicant's signal is shown in Figs. 4 and 5. A housing 45 is shown and this is similar in construction to housing 17 previously described with the exception that housing 45 is adapted to be mounted on strip 11 which is the dividing strip shown in windshield 10. Housing 45 has an upper side 45a and a lower side 45b. Said sides respectively have flanged portions 45c and 45d. A back portion 45e is provided and the same is adapted to overlie said flanged portions 45c and 45d. Said flanged members and said back members have alined apertures 46 and adapted to be disposed therethrough are metal screws 47 by which said housing is secured to said strip 11. The lens members and the fixtures shown in housing 45 are identical in structure with similar parts in the device shown in Fig. 3 and are so indicated by having the same characters. The operation of this modification is identical with the operation above described.

Thus it is seen that I have provided a simple and efficient lighting signal which is adapted to indicate to the operator of a motor vehicle whether or not the lights of the vehicle are turned on and which of said lights are turned on. Often in driving at dusk or in a lighted area, such as on city streets, it is difficult for the operator of a motor vehicle to tell whether or not the lights of his vehicle have been turned on. Applicant's device has been particularly adapted to be placed in a position on the cowl of a motor vehicle so that it can readily be seen by the operator of the vehicle without it being necessary for him to take his eyes away from the road ahead. On many vehicles a red signal light is present to indicate whether or not the high or low beam lights are turned on but this indicator is generally in such a position that the operator of the vehicle must turn his head away from the road ahead of him in order to see whether or not the red indicator is lighted. Many vehicles do not have a signal device to indicate whether the lighting system is turned on at all. Applicant's device is movable to a position where it is within the field of vision of the operator while he is driving the vehicle so that he can tell whether or not the lights of the vehicle have been turned on and which lights are lighted without taking his eyes away from his driving field of vision. Applicant's device is simple of construction and there is great utility in its use.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A signal device for an automobile having headlamps with high and low beam filaments and having parking lamps, having in combination a casing generally parallelepiped in form disposed in an upright position on the cowl of said automobile within the line of vision of the operator thereof, a base member movably secured to said cowl, a stem supporting said casing and being swingably secured to said base member for more specific adjustment of said device to accommodate different heights of operators, said casing having a plurality of openings vertically alined therein, lens of different colors respectively secured in each of said openings, lamps secured in said casing and respectively aligned with said openings and said lens and means for respectively connecting said lamps to said high and low beam filaments and to said parking lights whereby said lamps will be respectively lighted when said high or low beam filaments or parking light filaments are illuminated.

References Cited in the file of this patent

UNITED STATES PATENTS

| | | |
|---|---|---|
| 1,706,986 | Ryder | Mar. 26, 1929 |
| 1,710,708 | Murray | Apr. 30, 1929 |
| 1,829,037 | Bobroff | Oct. 27, 1931 |
| 1,909,077 | Schwarze | May 16, 1933 |
| 2,002,251 | Sensiba et al. | May 21, 1935 |
| 2,140,229 | Hipsley | Dec. 13, 1938 |
| 2,270,587 | Hall | Jan. 20, 1942 |
| 2,350,599 | Feldheim | June 6, 1944 |